FIG. 3

INVENTOR.
JOHN F. MORSE
BY Ely, Fryer & Hamilton
ATTORNEYS

Jan. 10, 1956  J. F. MORSE  2,729,984
MARINE ENGINE CONTROL SYSTEM
Filed June 3, 1952  9 Sheets-Sheet 4

INVENTOR.
JOHN F. MORSE
BY  Ely, Frye & Hamilton
ATTORNEYS

FIG. 13

Jan. 10, 1956  J. F. MORSE  2,729,984
MARINE ENGINE CONTROL SYSTEM
Filed June 3, 1952    9 Sheets-Sheet 9

INVENTOR.
JOHN F. MORSE
BY Ely, Frye, Hamilton
ATTORNEYS

United States Patent Office 2,729,984
Patented Jan. 10, 1956

2,729,984

MARINE ENGINE CONTROL SYSTEM

John F. Morse, Hudson, Ohio

Application June 3, 1952, Serial No. 291,451

27 Claims. (Cl. 74—472)

The invention relates generally to a control system for power boats, and particularly those craft which are large enough to utilize an engine room control and a signalling or communication system for transmitting directions to the engine room. More specifically, the invention relates to a control system having a single control lever, which may be located in the pilot house for operating in proper coordination both the transmission and throttle mechanism of the engine.

In my prior Patent No. 2,588,649, dated March 11, 1952, there is disclosed a single lever acting as a combined throttle and clutch control, but such a control is adapted for small power craft utilizing relatively small internal combustion engines. The purpose of the present invention is to provide a control system capable of operation by a single lever in the pilot house for operating the throttle and reverse gear mechanisms of a heavy diesel engine in the engine room below.

The present control system enables the pilot to control the complete operation of the engine from the bridge or pilot house, independently of the engineer, thus eliminating the possibility of mistakes and delay in transmitting instructions from the pilot house to the engineer, and in the carrying out of the instructions by the engineer.

Another object is to provide a single lever engine room control which may be operated by the engineer selectively with or without disengaging the pilot house control.

The present control system has improved means for preventing damage to the heavy engine and reverse gear mechanisms by positively preventing too rapid operation of the clutch or throttle. This is accomplished by a hydraulic delay mechanism which is preferably applied to the single control lever, for retarding the movement of the lever in a direction to operate the engine clutch and open the throttle while permitting unrestricted reverse movement of the lever to effect instantaneous closing of the throttle to neutral position for emergency stops. Such stops are frequently required in the operation of power craft to avoid collisions, and are accomplished by quickly reversing the control lever from a running position ahead or astern to the neutral position, and then reversing the torque of the propeller by continuing the reverse movement of the lever, as restricted by the delay mechanism to prevent damage to the reverse gear and engine.

The present control system also includes positive means automatically synchronizing or coordinating the operation of the engine clutches and the throttle, so as to cause the throttle to close before the clutch is disengaged, and to cause the clutch to be fully engaged before the throttle may be opened to drive the boat ahead or astern.

It is desirable to provide a mechanism for holding the control lever in position to maintain any desired running speed because otherwise the governors on most diesel engines will return to idling or closed position due to strong springs urging them to that position. Prior holding mechanisms known to me consist of a mechanical heavy ratchet latching mechanism which has a limited number of definite positions, and where twin engines are used the latching mechanisms must have an additional vernier adjustment to enable both engines to be set at exactly the same speed.

The present control system embodies a novel brake mechanism which will hold a throttle setting at an infinite number of positions of the control lever and yet allow the manual advance or return of the control lever to a different throttle setting without manipulating any latching mechanism. This novel brake mechanism completely eliminates the need for any ratchet mechanism and attendant complicated mechanical arrangements requiring adjustments.

The novel control system of the present invention thus meets all the particular requirements for easy operation of a marine engine by a single control lever which may be located in the pilot house, while providing safeguards for preventing automatically any damage to the engine and transmission parts.

The mechanism shown and described herein is, as far as known, the first practical system devised for single lever pilot house control of a marine engine, and requires a minimum of repair and maintenance. While a preferred embodiment is shown by way of example, various modifications and improvements may be made therein, without departing from the scope of the invention as defined in the appended claims. Referring to the drawings:

Fig. 11 is a transverse section as on line 11—11, Fig. 10, showing the engine room control in neutral position;

Similar numerals refer to similar parts throughout the drawings.

Figure 1:
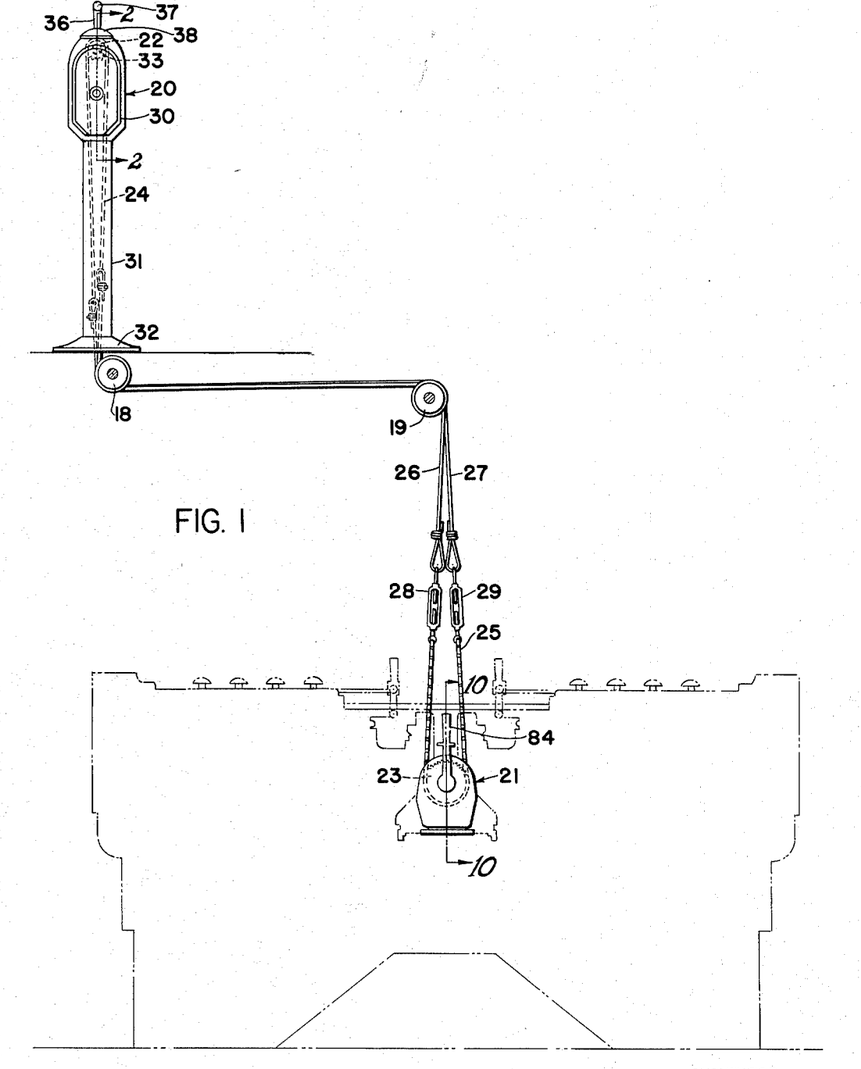
Fig. 1 is a general somewhat schematic view showing the manner of connecting the pilot house control to the engine room control for complete operation of the engine from the pilot house.

Referring first to Fig. 1, the pilot house control mechanism is indicated generally at 20 and the engine room control is indicated generally at 21. The pilot house control includes a shaft having a sprocket 22 thereon operatively connected to a sprocket 23 on the engine room control shaft by means of roller chains 24 and 25 meshing with the sprockets 22 and 23, respectively, the chains being connected by cables 26 and 27 running over suitable pulleys 18 and 19 and by turnbuckles 28 and 29, respectively. The tooth ratio of the sprocket 23 to sprocket 22 may be 2 to 1 so that the pilot house control shaft rotates twice as many degrees as the engine room control shaft. The pilot house control is mounted in a suitable housing 30 which may be mounted on a pedestal 31 supported on a base 32, and the engine room control sprocket and chain are located adjacent to a marine diesel engine, or twin engines, outlined in dot-dash lines in Fig. 1.

Figure 2:
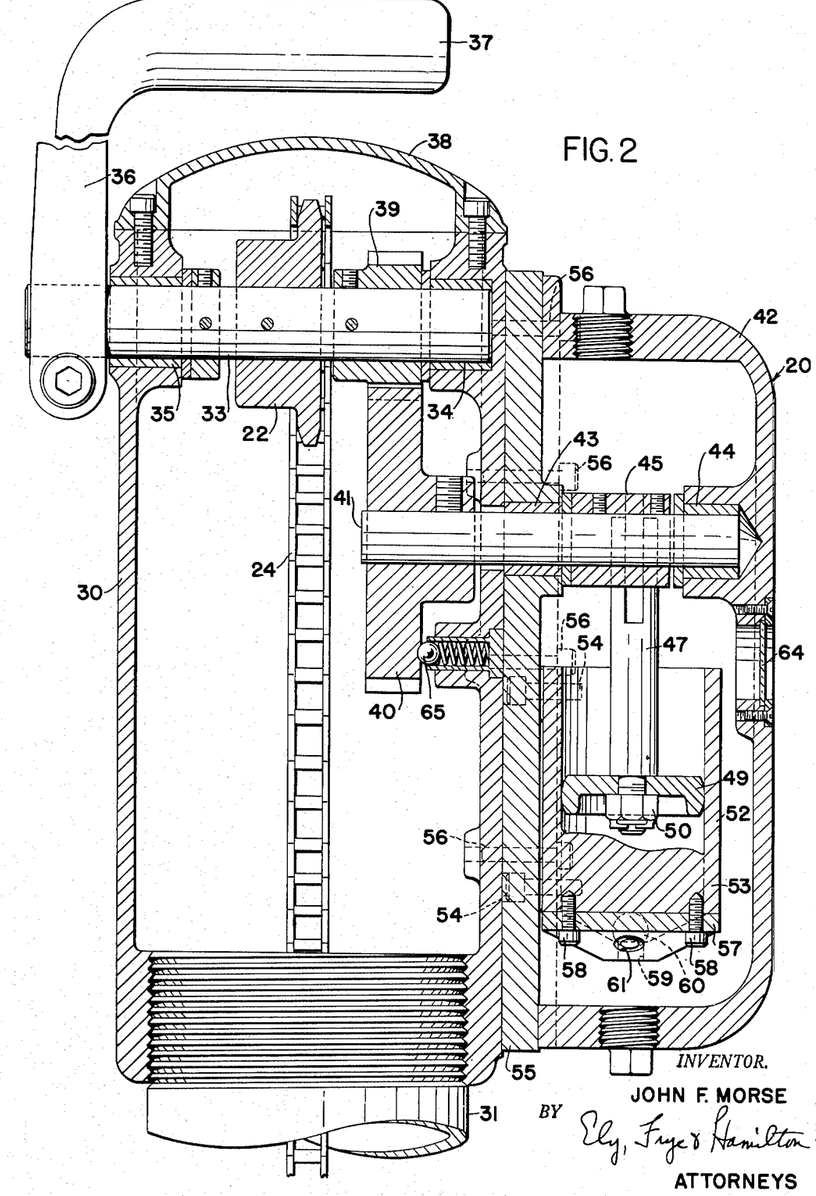
Fig. 2 is an enlarged fragmentary sectional view of the novel pilot house control, as on line 2—2, Fig. 1.
Figure 2:
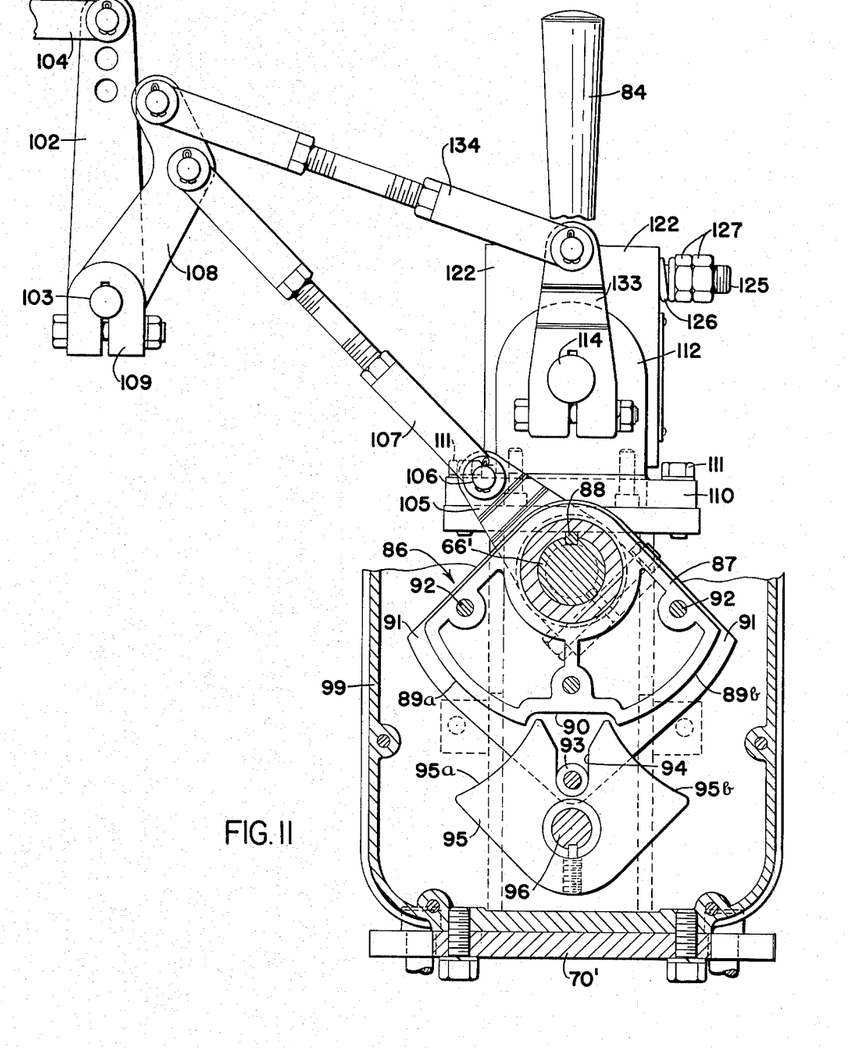
Figure 3:
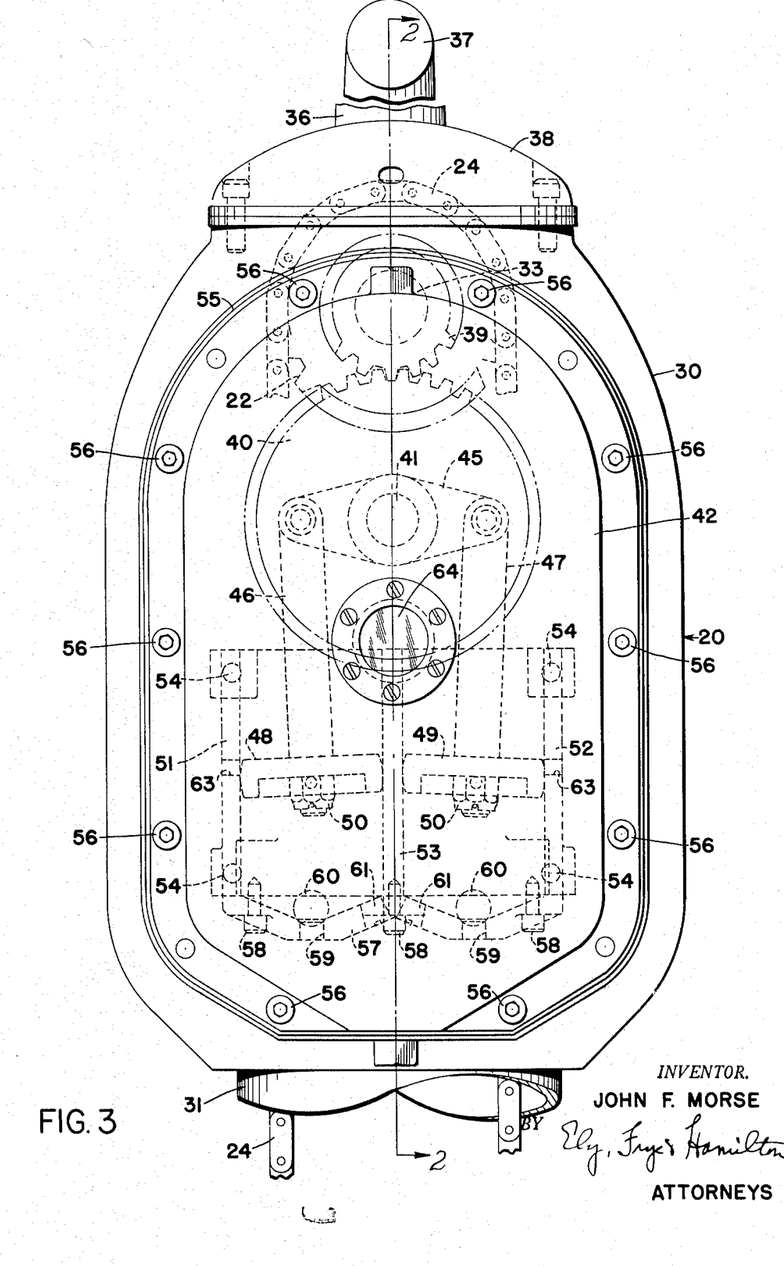
Fig. 3 is a front elevation thereof.

Referring to Figs. 2 and 3, the sprocket 22 carrying chain 24 is fixed on the pilot house control shaft 33 journaled in suitable bearings 34 and 35 in the upper part of the housing 30. The rear end of the shaft 33 projects from the housing and has clamped thereon a control lever 36 which may have a handle 37 extending angularly over the removable cover 38 of the housing. A pinion 39 is secured on shaft 33 and meshes with a gear 40, preferably at a 1 to 2 ratio, secured on a counter shaft 41 which extends into a housing 42 for the hydraulic delay mechanism and is journaled in suitable bearings 43 and 44 in the walls of the housing. Between the bearings 43 and 44 a double-ended rocker arm 45 is secured on the shaft 41, and the rocker arm moves through an arc one-half as great as that of the control lever 36, due to the 1 to 2 gear ratio between pinion 39 and gear 40.

Figure 4:
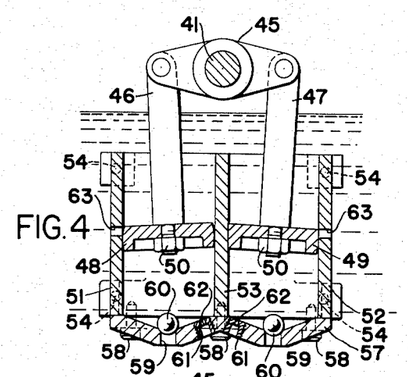
Fig. 4 is a detached cross sectional view of the piston and cylinder arrangement which comprises the hydraulic delay mechanism within the pilot house control housing, and shown at the neutral position of the control lever.

As shown in Figs. 2, 3 and 4, the rocker arm 45 is pivotally connected at its outer ends to the upper ends of connecting rods 46 and 47 having pistons 48 and 49 secured on their lower ends by nuts 50. As best shown in Fig. 4, the outer surfaces of the pistons are spherically rounded so that they will maintain uniform clearance within the bores of cylinders 51 and 52, regardless of the angles of the connecting rods. The cylinders 51 and 52 may have a common partition wall 53, and are preferably mounted by screws 54 on the rear plate 55 of housing 42, the housing and rear plate being secured to the chain housing 30 by cap screws 56. The bottom walls 57 for the cylinders 51 and 52 may be attached thereto by cap screws 58 and is formed to provide conical bottom surface for the cylinders, each bottom surface having an outlet port 59 at its lower end on which a check ball 60 normally rests.

The bottom wall in each cylinder is provided with a removable plug 61 having a metering orifice 62 therein designed to restrict the flow of liquid to a predetermined speed, and the outer walls 51 and 52 have side ports 63. The housing 42 is filled with light oil to a level well above the top of the cylinders 51 and 52, as indicated in Fig. 4. By changing the plugs 61, different sizes of metering orifices can be provided to suit different conditions of operation. The clearances between the pistons 48 and 49 and their cylinders is very small, so that the amount of oil leaking past the pistons does not affect the operation of the metering orifices. An inspection window 64 may be provided in the housing 42, through which the oil level may be observed.

Figure 5:
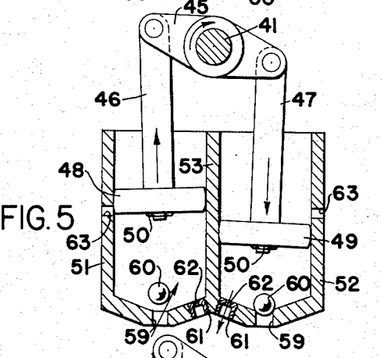
Figs. 5 and 6 are similar views showing the positions of the pistons as the control lever is moved from neutral to "idling ahead" position and then to "full speed ahead" position.

Assuming that when the control lever 36 is in its upright position shown in Figs. 1, 2 and 3, the reverse gear of the engine transmission is in neutral position, and that when the lever is rotated clockwise as viewed in Fig. 3 the engine is operated to move the boat ahead, the operation of the hydraulic delay mechanism will now be described. As the lever 36 is moved toward "ahead" position to what may be termed "idling ahead" position, the rocker arm 45 is rotated as indicated in Fig. 5 to raise piston 48 and lower piston 49. The suction thus created in cylinder 51 raises the ball 60 therein as shown and allows oil to flow freely through the port 59 into the cylinder, as indicated by the arrow. At the same time, the descending piston 49 is forcing the ball 60 therein tightly against its port 59 so that the only escape for the oil from cylinder 52 is through the metering orifice 62, as indicated by the arrow in Fig. 5. Since this orifice restricts the escape of oil to a predetermined speed the movement of the control lever and hence the movement of the reverse gear of the transmission is restrained or delayed.

Figure 6:
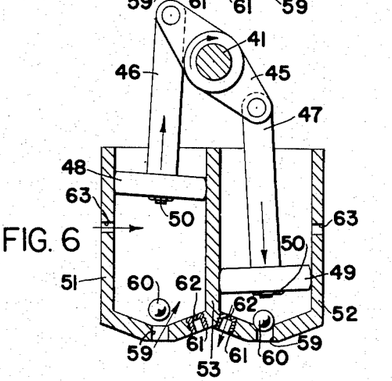

As the control lever is moved further ahead and actuates the throttle mechanism of the engine, the piston 48 continues to rise and the piston 49 continues to descend until they reach the "full speed ahead" position shown in Fig. 6. During this movement oil can flow freely into cylinder 51 through its ports 59 and 63 but the only flow out of cylinder 52 is through its restricted orifice 62 because the ball 60 in cylinder 52 continues to be forced against its seat closing its port 59. Thus the movement of the control lever is retarded or delayed continuously from neutral to full speed ahead position so that any possibility of damage to the heavy engine and reverse gear mechanism is avoided by preventing too rapid operation of the clutches or throttle.

Figure 7:
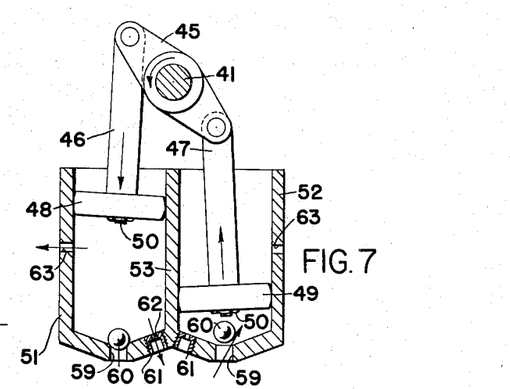
Figs. 7, 8 and 9 are similar views showing the position of the pistons as the control leever is reversed from "full speed ahead" position to "idling ahead" and then to neutral position, from which it can be moved on through "idling astern" to "full speed astern" in the reverse of the operation shown in Figs. 5 and 6.
Figure 8:
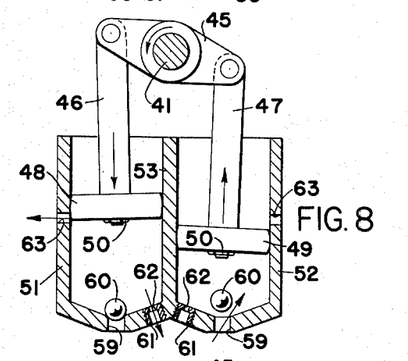
Figure 9:
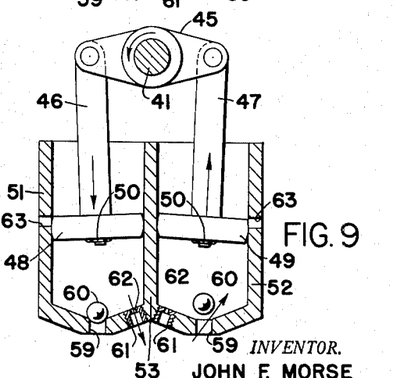

With the control lever in full speed head position, when the pilot wishes to reverse his engines, he moves the control lever backwards toward neutral position, thus rotating the shaft 41 and rocker arm 45 counterclockwise, as indicated in Fig. 7. Starting from the full speed ahead position, the piston 48 descends and the piston 49 rises, creating suction in cylinder 52 to lift the ball 60 therein off its seat and allow oil to flow freely into cylinder 52. At the same time oil flows freely out of the side port 63 in cylinder 51, as well as out of its restricted orifice 62, so that neither piston restricts the return or backward movement of the control lever, and the pilot can return the lever rapidly through the "idling ahead" position of Fig. 8 and to the neutral position of Fig. 9 before the piston 48 completely closes off the side port 63 in cylinder 51 to restrict the escape of oil therefrom. If the pilot should continue the counterclockwise movement of the control lever through neutral toward "idling astern," the reverse of the operation shown in Fig. 5 occurs, with the piston 48 restricting the movement of the control lever all the way to the "full speed astern" position, but return movement to neutral position is unrestricted. The neutral position of the control lever may be yieldingly maintained by means of a spring pressed ball 65 engaging an indentation in gear wheel 40 (Fig. 2).

Figure 10:
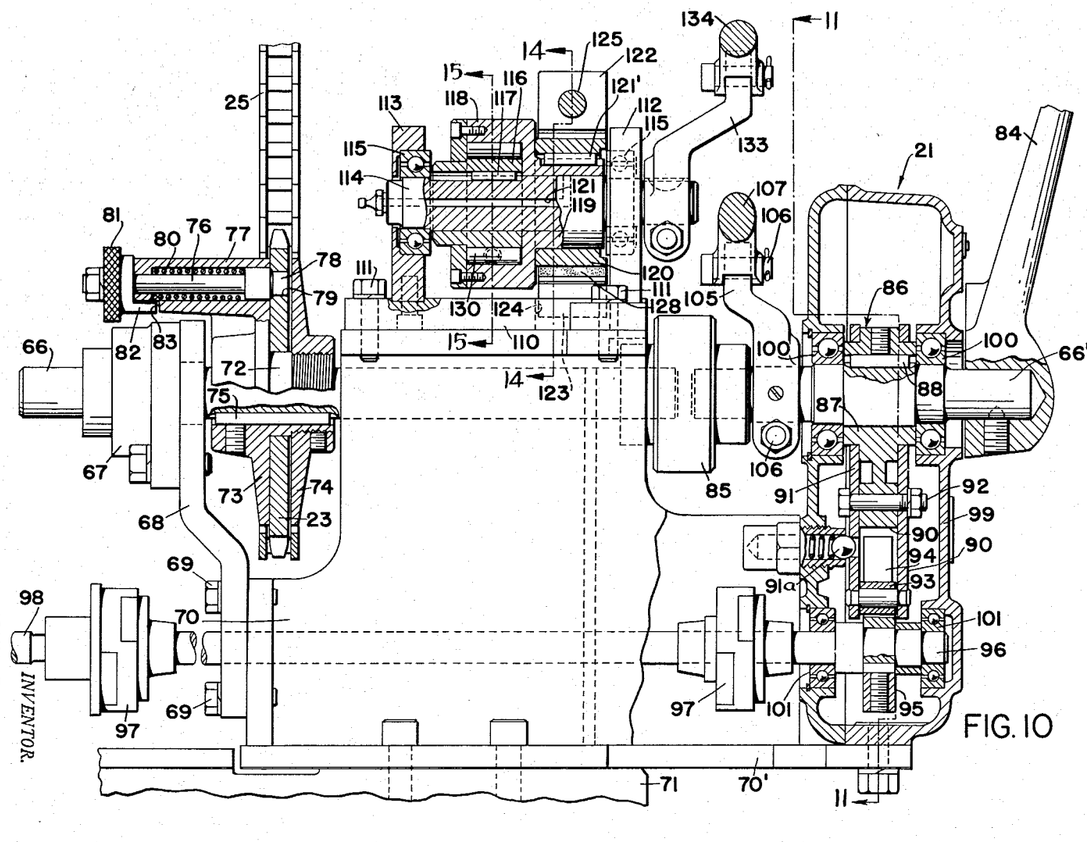
Fig. 10 is an enlarged longitudinal section, partly in elevation, of the engine room control, as on line 10—10, Fig. 1.

Referring now to the engine room control mechanism 21, in Fig. 10 is shown the chain 25 meshing with sprocket 23 for operatively connecting the pilot house control to the engine room control. The sprocket 23 is mounted for detachable connection on the control shaft 66, the rear end of which is journaled in an outboard bearing 67 mounted on a bracket 68 secured by bolts 69 to a frame 70 supporting the control mechanism on the engine 71. The sprocket 23 is mounted for freely turning on a bearing surface 72 formed on a rear plate 73 abutting the sprocket, and the front end of the bearing is threaded and has screwed thereon a front plate 74 for positioning the sprocket on the bearing surface 72, the combined plates 73 and 74 being fixed on shaft 66 by a key 75.

A delatching pin 76 normally connects the sprocket 23 to the plate 73, the pin being axially slidable in a tubular boss 77 formed on the plate, and having a forwardly projecting end 78 for being piloted in to a single hole 79 in the sprocket. A spring 80 abuts a shoulder on the pin for holding it in the hole 79 and knob 81 is secured on the rear end of the pin for manually withdrawing from the hole 79 to disconnect the sprocket 23 from the shaft 66. An offset shoulder 82 on the knob fits in a notch 83 on the boss 77 when the pin is engaged in hole 79 in the sprocket, and when the knob is pulled rearwardly to withdraw the pin, a half turn of the knob will engage the shoulder 82 with the rear end of the boss and lock the pin in withdrawn or unlatched position.

Thus if the engineer is instructed to operate the control mechanism from the engine room without connection with the pilot house control, he may disconnect the pilot house drive by operating the delatching pin 76 in the manner described, and then operate the control shaft 66 independently by means of the control lever 84 secured on control shaft extension 66' which is axially connected to the front end of shaft 66 by a coupling 85. The control shaft 66 may be operated by means of the lever 84 without disconnecting the pilot house drive, in which case the pilot house control will be operated and the hydraulic delay mechanism will restrain operation of the engine room control in the same manner as if the control were being operated from the pilot house.

A control sector indicated generally at 86 is mounted on shaft 66' and the sector includes a body 87 fixed on the shaft by means of a key 88, and having arcuate surfaces 89a and 89b on its lower end separated by a notch or recess 90. Front and rear plates 91 are bolted to opposite faces of the body by bolts 92, and their lower ends depend below the body and mount a cam roller 93 between the plates. When the control shaft 66 and lever 84 are in the neutral position of Figs. 10 and 11, corresponding with the neutral position of the pilot house control, the roller 93 is engaged in the slot 94 of the Geneva cam 95 and the cam slot 94 is in upright position. The cam 95 is keyed on the front end of a transmission control shaft 96 extending parallel to upper shaft 66 and connected through couplings 97 and an extension shaft to the shaft 98, which actuates the hypraulic control valve (not shown) operating the clutches and reverse gear of the marine engine to neutral, forward or reverse positions. The sector and cam mechanism is preferably enclosed in a housing 99, and the shafts 66' and 96 are journaled in suitable anti-friction bearings 100 and 101, respectively, mounted in the walls of the housing, the housing being supported on the base plate 70' of the frame 70. A spring-pressed ball 91a may be mounted in the housing 99 for engaging an indentation in one of the plates 91, for yieldingly holding the sector in neutral position.

Figure 12:
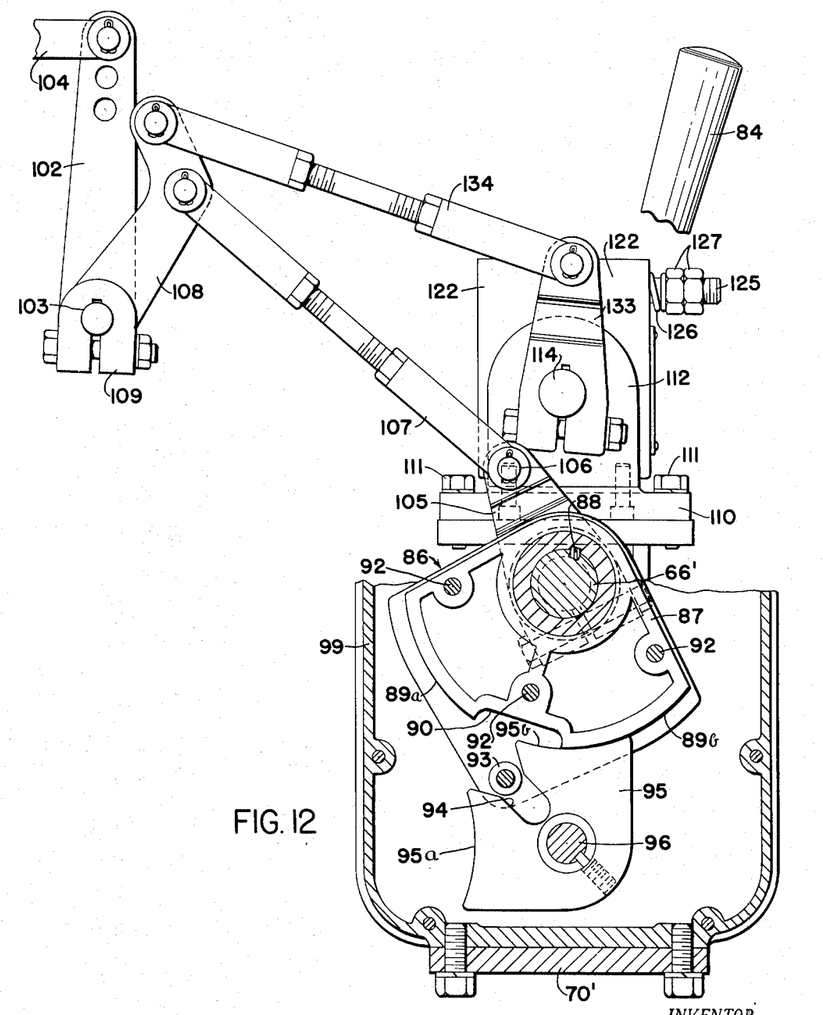
Fig. 12 is a similar view showing the control in idling ahead position.
Figure 13:
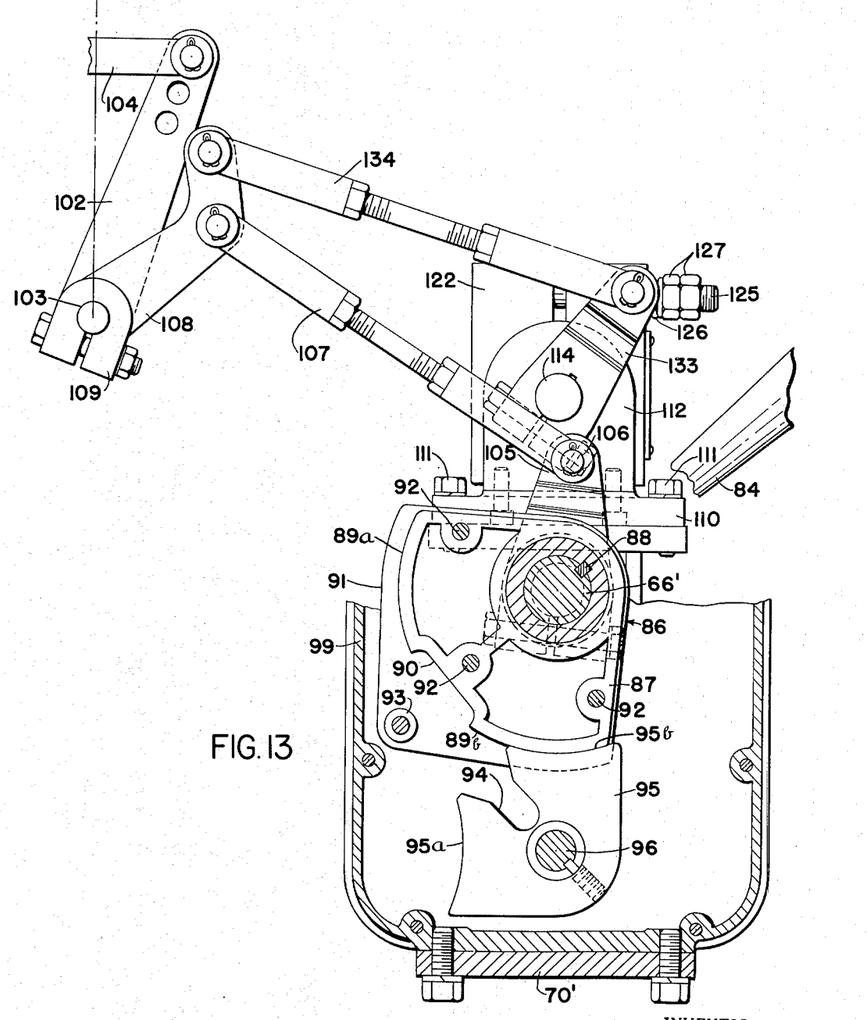
Fig. 13 is a similar view showing the control in full speed ahead position.

When the control shaft 66 is moved clockwise toward "ahead" position in response to a clockwise movement of the pilot house control, or by movement of the control lever 84, the roller 93 moves the cam 95 counter-clockwise as shown in Fig. 12, which operates the hydraulic valve control shaft 98 to "ahead" position, and in this position of the cam the roller 93 leaves the cam slot 94, but sliding engagement of the arcuate surface 89b on the sector and the mating curved surface 95b of the cam holds the cam and the hydraulic valve in the "ahead" position as the control shaft is further to the "full speed ahead" position of Fig. 13. If the control shaft 66 is moved in the reverse direction from neutral, the cam 95 first operates the hydraulic valve to "astern" position and the mating surfaces 89a and 95a hold the cam in that position as the shaft is moved to "full speed astern."

The operation of the hydraulic control valve operating the clutches and reverse gear of the engine is synchronized with the operation of throttle mechanism by operatively connecting the shaft 66' with the throttle control lever 102 which is mounted on a rocker shaft 103 and connected in a usual manner to the throttle or governor by means of a link 104 pivotally connected to the top of the lever 102. The shaft 66' has an offset arm 105 clamped thereon and the outer end of arm 105 is pivotally connected at 106 to an endwise adjustable link 107 which is pivoted at its outer end to the angular portion of a throttle control arm 108 clamped on the rocker shaft 103 by a clevis 109.

The movement of the throttle lever 102, which occurs during the movement of the cam from neutral to the position of Fig. 12 to operate the hydraulic valve, is slight, and is indicated as being 3° in Fig. 12. This movement may be utilized to give the engine a slight acceleration as the clutch is engaged to prevent stalling the engine, or if desired a slotted link or lost motion connection may be embodied in the governor rod, so that the governor is not moved during this first 3° of travel. Now, as the shaft 66' is rotated farther to the "full speed ahead" position of Fig. 13, the throttle control lever is pulled open to its full speed position. Thus as the control shaft is operated from "neutral" to "full speed ahead," the engine clutch is engaged before the throttle is opened, and on returning the control shaft to neutral, the throttle is closed before the clutch is disengaged, thereby preventing damage to the engine and transmission.

Referring to Fig. 11, it will be seen that the lever 105 and link 107 are connected in alignment or on center with the pivot connection on arm 108 when the shaft 66' is in neutral position. Thus as the shaft is rotated either clockwise as in Fig. 12 or reversely toward "astern" position, the pivotal connection 106 will move "over center" with respect to the connection with arm 108, with the result that the throttle lever 102 will be pulled open in either case.

The one-direction brake mechanism for holding the throttle control in any desired position to which it has been set, so as to maintain a selected running speed in either direction, will now be described. Conventional governors for marine engines ordinarily are provided with strong springs urging them to idling or closed position, and the engine controls must be held or latched at any desired running position to prevent the return action of the governor springs. Mechanical latching means are unsatisfactory, particularly on twin engines because of the exact synchronization required to set both engines at exactly the same speed. The present brake mechanism automatically yieldingly or frictionally holds the throttle control at any one of an infinite number of positions to which it may be set.

Figure 14:
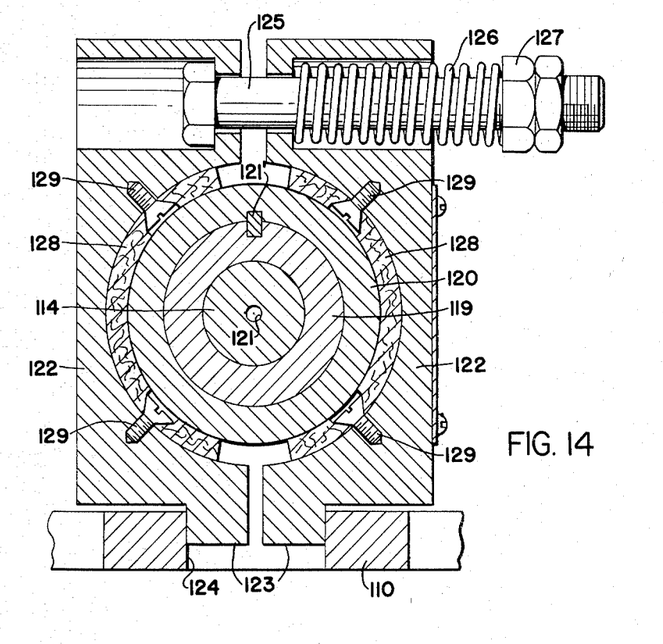
Fig. 14 is an enlarged transverse section through the brake mechanism, taken on line 14—14, Fig. 10.
Figure 15:
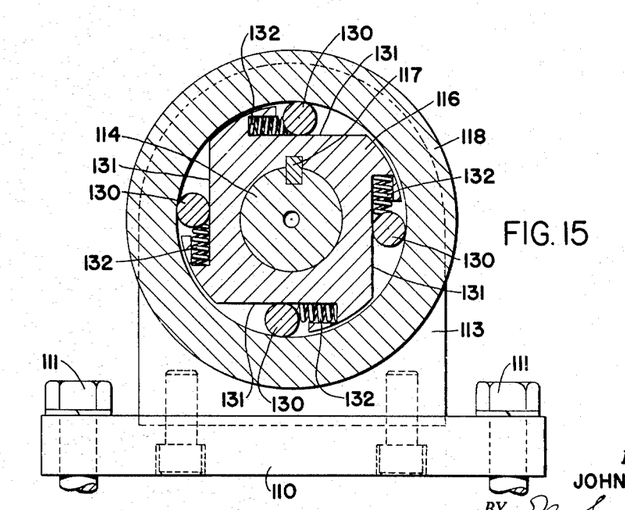
Fig. 15 is an enlarged transverse sectional view taken on line 15—15, Fig. 10.

Referring to Figs. 10, 14 and 15, the novel brake mechanism comprises a base plate 110 secured to the top of the frame 70 by cap screws 111 and supporting two upright bearing brackets 112 and 113 journaling a shaft 114 in anti-friction bearings 115. A one-way clutch is mounted on the shaft 114 between the brackets 112 and 113, and the driving member 116 of the clutch is keyed to the shaft 114 by key 117. The driven member comprises an outer annular member 118 having a forwardly extending concentric sleeve 119 in which the shaft 114 is journaled, and a brake drum 120 is supported on and keyed to sleeve 119 by a key 121'. An axial passageway 121 supplies lubricant to the outer surface of shaft 114 on which sleeve 119 is journaled.

Two brake clamping band members 122 surround the brake drum 120 and their lower ends 123 are pivotally mounted in a slot 124 in the base plate 110. Their upper ends are yieldingly clamped together by means of the bolt 125 carrying the compression spring 126 and adjusting nuts 127 for regulating the amount of compression. The inner cylindrical surfaces of the band members 122 are lined with suitable brake lining material 128 secured to the band member by countersunk screws 129. Thus the bands 122 are yieldingly clamped on the brake drum 120 to frictionally hold it against rotation at all times.

A plurality of rollers 130 is mounted between the driving member 116 and the driven member 118 in wedge shaped slots 131 preferably formed in the periphery of the member 117. Adjacent each roller is a recess which houses a spring 132 yieldingly urging the rollers tangentially against the inner surface of the driven member 118. The rollers and driving and driven members are hardened steel with ground surfaces, and running in oil to insure long wear and accuracy. Viewed from the front as in Fig. 15, if the shaft 114 is rotated clockwise by the lever 133 secured on its front end, the rollers 130 slip back a slight amount in the slots 131 against the pressure of springs 132 and allow the driving member or hub 116 to rotate freely within member 118. If the shaft is rotated counterclockwise by lever 133, the rollers will immediately wedge between the surfaces of slots 131 and the inner surface of member 118, causing it to rotate with the hub 116. As the sleeve 119 of member 118 rotates counterclockwise it rotates drum 120 with it and the rotation of the drum is frictionally resisted by the brake bands and can only rotate when that frictional resistance is overcome.

Referring to Figs. 11, 12 and 13, it will be seen that the upper end of lever 133 is pivoted to a lengthwise adjustable link 134 pivotally connected at its other end to the upper angular end of throttle control arm 108, so that as the arm is rotated clockwise by the control shaft 66 to open the throttle to any position up to the "full speed ahead" position of Fig. 13, the shaft 114 of the brake device rotates freely in a clockwise direction in the manner previously described. Any reverse or counterclockwise rotation of the arm 108 from any advanced position will be resisted by the braking device because counterclockwise rotation of the lever 133 is frictionally resisted by the brake bands. The amount of this frictional resistance is adjusted so that it is sufficient to overcome the force exerted by the governor springs urging the throttle arm to return to idling or closed position, and thus the throttle arm will stay at an infinite number of advanced positions for maintaining any desired running speed.

When the control shaft is rotated counterclockwise from the neutral position of Fig. 11, to propel the boat astern, as the lever 105 passes "over center" and pulls the throttle open the brake shaft lever 133 will rotate freely in a clockwise direction, the same as when the throttle is opened to propel the boat ahead, and the braking device will frictionally resist return movement of the throttle toward idling or closed position from any position. Thus the throttle will stay at any position for maintaining a desired running speed astern. The throttle may be advanced manually in either direction from any particular setting and will be held at the new position by the braking mechanism. At the same time, the throttle may be reversed toward neutral from any particular setting by manually overcoming the frictional resistance of the braking mechanism.

In the operation of the improved control system from the pilot house, assuming that the sprocket 23 is in driving engagement with the engine room control shaft 66, the pilot moves the pilot house control lever 36 clockwise to propel the boat ahead and counterclockwise to propel it astern. This movement in either direction is restrained or retarded to a predetermined rate by means of the hydraulic delay mechanism in housing 42, thereby preventing any possibility of damage to the engine and reverse gear mechanism by too rapid operation of the engine clutches and throttle. As the control lever 36 is advanced in either direction at the rate predetermined by the delay mechanism, the engine room control shaft 66 is automatically operated and first actuates the hydraulic control valve to operate reverse gear to forward or reverse position, and then opens the throttle to the desired setting where it is held by the braking mechanism. Now if the pilot is required to make a sudden stop for any reason, he reverses the control lever 36 to neutral. In order to make this reverse movement substantially instantaneously he applies sufficient force to overcome the frictional resistance of the braking mechanism, and when the lever has reached neutral, the frictional resistance ceases but continued movement in the same direction to reverse the torque of the propeller and stop the boat is retarded by the hydraulic delay mechanism.

Thus the present improved control system may be operated wholly from the pilot house and has means for automatically retarding advance movement of the controls to protect the engine and transmission, positive means for automatically synchronizing the operation of the throttle with the engine clutches, and means for automatically holding the controls at any throttle setting running ahead or astern. The system fully safeguards against damage to any of the engine parts by improper or careless operation and eliminates the needs for any communication between pilot house and engine room, while permitting separate operation by the engineer if desired. The novel braking mechanism for automatically holding the throttle at any setting eliminates the need for complicated ratchet latching mechanism with vernier adjustments and at the same time provides for an unlimited number of settings.

The embodiment of the invention illustrated and described herein is by way of example, and the invention is not to be limited to exact details of construction except as shall appear from the scope and spirit of the appended claims.

What is claimed is:

1. A pilot house control apparatus for a marine engine having a throttle and a reversible transmission, an engine room control shaft operatively connected to said throttle and transmission, said unit comprising a single manually oscillatable lever in the pilot house, means operatively connecting said lever to said control shaft, and a hydraulic delay mechanism for retarding movement of said lever from neutral position in either direction to retard engaging the transmission and opening the throttle.

2. A pilot house control apparatus for a marine engine having a throttle and a reversible transmission, an engine room control shaft operatively connected to said throttle and transmission, said unit comprising a single manually oscillatable lever in the pilot house, means operatively connecting said lever to said control shaft, a hydraulic delay mechanism for retarding movement of the lever from neutral position in either direction to retard engaging the transmission and opening the throttle, and a one-direction brake device having a shaft operatively connected to said control shaft for yieldingly restraining closing movement of the throttle, said brake device having a driving member fixed on said brake shaft and a driven member, and a friction brake engaging the driven member.

3. A pilot house control apparatus for a marine engine having a throttle and a reversible transmission, an engine room control shaft operatively connected to said throttle and transmission, said unit comprising a single manually oscillatable lever in the pilot house, means operatively connecting said lever to said control shaft, a hydraulic delay mechanism for retarding movement of the lever from neutral position in either direction to retard engaging the transmission and opening the throttle, and cam means connected to said control shaft for engaging said transmission before the throttle is opened by operation of said shaft.

4. A pilot house control apparatus for a marine engine having a throttle and a reversible transmission, an engine room control shaft operatively connected to said throttle and transmission, said unit comprising a single manually oscillatable lever in the pilot house, means operatively connecting said lever to said control shaft, a hydraulic delay mechanism for retarding movement of the lever from neutral position in either direction to retard engaging the transmission and opening the throttle, a one-direction brake device having a shaft operatively connected to said control shaft for yieldingly restraining closing movement of the throttle, said brake device having a driving member fixed on said control shaft and a driven member, and a friction brake engaging the driven member, and cam means connected to said control shaft for engaging said transmission before the throttle is opened by operation of said shaft.

5. A pilot house control apparatus for a marine engine having a throttle and a reversible transmission, an engine room control shaft operatively connected to said throttle and transmission, said unit comprising a manually oscillatable control lever in the pilot house operatively connected to said control shaft, a hydraulic delay mechanism for retarding movement of said control shaft from neutral position in either direction to retard engaging the transmission and opening the throttle, a second lever on the control shaft, and means for disconnecting said first lever from said control shaft for selectively operating said control shaft independently of the pilot house control.

6. A pilot house control unit for a marine engine having a throttle and a reversible transmission, said unit comprising a single manually oscillatable lever in the pilot house, said lever having neutral, forward and reverse positions, connections from said lever to said throttle and transmission, and a hydraulic delay mechanism connected to said lever for retarding movement of said lever from neutral in either direction while allowing unrestricted return movement of said lever to neutral position.

7. A pilot house control unit for a marine engine having a throttle and a reversible transmission, said unit comprising a single manually oscillatable lever in the pilot house, said lever having neutral, forward and reverse positions, connections from said lever to said throttle and transmission, and a hydraulic dual cylinder mechanism connected to said lever for retarding movement of said lever from neutral position in either direction and for allowing unrestricted return movement of said lever in either direction to neutral position.

8. A pilot house control unit for a marine engine having a throttle and a reversible transmission, said unit having a control shaft, connections from said control shaft to said throttle and transmission, a single manually operable lever on said control shaft having neutral, forward and reverse positions, a rocker arm connected intermediate its ends to said shaft, hydraulic pistons connected to the ends of said rocker arms and reciprocable in hydraulic cylinders, and said cylinders having hydraulic fluid ports so constructed and arranged as to retard movement of said control shaft from neutral position in either direction and to allow unrestricted return movement of said shaft in either direction to neutral.

9. A pilot house control unit for a marine engine having a throttle and a reversible transmission, said unit having a control shaft, connections from said control shaft to said throttle and transmission, a single manually operable lever on said control shaft having neutral, forward and reverse positions, a rocker arm connected intermediate its ends to said shaft, a housing containing hydraulic fluid, hydraulic cylinders in said housing open to said fluid, pistons in said cylinders, one piston connected to each end of said rocker arm, said cylinders each having metering ports for restricting the movement of the piston therein in one direction to restrict movement of the control shaft from neutral position in either direction, and said cylinders each allowing free movement of the piston therein in the opposite direction to allow free return movement of the control shaft in either direction to neutral.

10. Control apparatus for a marine engine having a throttle and a reversible transmission, including an engine room control shaft, means for detachably connecting said control shaft with a pilot house control, a manually operable lever on said shaft, means operatively connecting said shaft to said throttle, means operatively connected to said shaft for engaging said transmission before the throttle is opened and for preventing disengagement of said transmission until the throttle is closed, and hydraulic delay mechanism for retarding engagement of the transmission and opening of the throttle but allowing unrestricted closing of the throttle and disengagement of the transmission.

11. Control apparatus for a marine engine having a throttle and a reversible transmission, including a control shaft, means operatively connecting said shaft to said throttle, and a one-direction brake device having a shaft operatively connected to said control shaft for yieldingly holding the throttle at any point in its range of opening movement said brake device having a driving member fixed on said brake shaft and a driven member, and a friction brake engaging the driven member.

12. Control apparatus for a marine engine having a throttle and a reversible transmission, including a control shaft, a throttle control arm operatively connected to the control shaft, and a one-direction brake device having a shaft operatively connected to said throttle control arm for yieldingly holding said arm in any position of adjustment in its throttle opening range, said brake device having a driving member fixed on said brake shaft and a driven member, and a friction brake engaging the driven member.

13. Control apparatus for a marine engine having a throttle and a reversible transmission, including a control shaft, a throttle control arm, means connecting said control shaft to said arm for moving the arm in one direction to open the throttle as the shaft moves from a neutral position in either direction, and a one-direction brake device having a shaft operatively connected to said arm for frictionally restraining movement of the arm to throttle-closing position and allowing free throttle-opening movement of the arm, said brake device having a driving member fixed on said brake shaft and a driven member, and a friction brake engaging the driven member.

14. Control apparatus for a marine engine having a throttle and a reversible transmission, including a control shaft, a throttle control arm, means connecting said control shaft to said arm for moving the arm in one direction to open the throttle as the shaft moves from a neutral position in either direction and to close the throttle as the shaft returns to neutral position in either direction, a brake shaft, means operatively connecting said brake shaft to said throttle control arm, and a friction brake device on said brake shaft for restraining rotation thereof in one direction causing closing of the throttle and allowing free rotation of the brake shaft in the opposite direction, said brake device having a driving member fixed on said brake shaft and a driven member, and a friction brake engaging the driven member.

15. Control apparatus for a marine engine having a throttle and a reversible transmission, including a control shaft, means operatively connecting said shaft to said throttle, a one-direction brake device having a shaft operatively connected to said control shaft for yieldingly holding the throttle at any point in its range of opening movement, said brake device having a driving member fixed on said brake shaft and a driven member, and a friction brake engaging the driven member, and a hydraulic delay mechanism operatively connected to said control shaft for retarding its rotation in a direction to open the throttle but allowing unrestricted rotation of said shaft in the opposite direction.

16. Control apparatus for a marine engine having a throttle and a reversible transmission, including a control shaft, a throttle control arm operatively connected to the control shaft, a one-direction brake device having a shaft operatively connected to said throttle control arm for yieldingly holding said arm in any position in its throttle opening range, said brake device having a driving member fixed on said brake shaft and a driven member, and a friction brake engaging the driven member, and a hydraulic delay mechanism operatively connected to said control shaft for retarding its rotation in a direction to open the throttle but allowing unrestricted rotation of said shaft in the opposite direction.

17. Control apparatus for a marine engine having a throttle and a reversible transmission, including a control shaft, a throttle control arm, means connecting said control shaft to said arm for moving the arm in one direction to open the throttle as the shaft moves from a neutral position in either direction, a one-direction brake device having a shaft operatively connected to said arm for frictionally restraining movement of the arm to throttle-closing position and allowing free throttle-opening movement of the arm, said brake device having a driving member fixed on said brake shaft and a driven member, and a friction brake engaging the driven member, and a hydraulic delay mechanism operatively connected to said control shaft for retarding its rotation in a direction to open the throttle but allowing unrestricted rotation of said shaft in the opposite direction.

18. Control apparatus for a marine engine having a throttle and a reversible transmission, including a control shaft, a throttle control arm, means connecting said control shaft to said arm for moving the arm in one direction to open the throttle as the shaft moves from a neutral position in either direction and to close the throttle as the shaft returns to neutral position in either direction, a brake shaft, means operatively connecting said brake shaft to said throttle control arm, a friction brake device on said brake shaft for restraining rotation thereof in one direction causing closing of the throttle and allowing free rotation of the brake shaft in the opposite direction, said brake device having a driving member fixed on said brake shaft and a driven member, and a friction brake engaging the driven member, and a hydraulic delay mechanism operatively connected to said control shaft for retarding its rotation in a direction to open the throttle but allowing unrestricted rotation of the shaft in the opposite direction.

19. Control apparatus for a marine engine having a throttle and a reversible transmission, including an engine control shaft, a transmission actuating shaft, cam means operatively connecting said transmission-actuating shaft to said control shaft, and a hydraulic delay mechanism for retarding movement of said control shaft from neutral position in either direction while allowing unrestricted return movement of said shaft to neutral position.

20. Control apparatus for a marine engine having a throttle and a reversible transmission, including an engine control shaft, means operatively connecting said control shaft to said throttle, cam means connecting said control shaft to said transmission for engaging said transmission before the throttle is opened, and a hydraulic delay mechanism for retarding movement of said control shaft from neutral position in either direction while allowing unrestricted return movement of said shaft to neutral position.

21. Control apparatus for a marine engine having a throttle and a reversible transmission, including an engine control shaft, means operatively connecting said control shaft to said throttle, a one-direction brake device having a shaft operatively connected to said control shaft for frictionally restraining closing movement of the throttle, said brake device having a member fixed on said brake shaft and a driven member, and a friction brake engaging the driven member, cam means connecting said control shaft to said transmission for engaging said transmission before the throttle is opened, and a hydraulic delay mechanism for retarding movement of said control shaft from neutral position in either direction while allowing unrestricted return movement of said shaft to neutral position.

22. Control apparatus for a marine engine having a throttle and a reversible transmission, including an engine control shaft having forward and reverse positions and an intermediate neutral position, means connecting said control shaft to said throttle for opening the throttle as the shaft moves from neutral in either direction, a one-direction brake device having a shaft operatively connected to said control shaft for frictionally restraining return movement of the shaft in either direction to close the throttle, said brake device having a driving member fixed on said brake shaft and a driven member, and a friction brake engaging the driven member, and cam means connecting said control shaft to said transmission for engaging the transmission before the throttle is opened and for disengaging the transmission after the throttle is closed.

23. Control apparatus for a marine engine having a throttle and a reversible transmission, including an engine control shaft having forward and reverse positions and an intermediate neutral position, means connecting said control shaft to said throttle for opening the throttle as the shaft moves from neutral in either direction, a one-direction brake device having a shaft operatively connected to said control shaft for frictionally restraining return movement of the shaft in either direction to close the throttle, said brake device having a driving member fixed on said brake shaft and a driven member, and a friction brake engaging the driven member, a hydraulic delay mechanism for retarding movement of said control shaft from neutral position in either direction, and cam means connecting said control shaft to said transmission for engaging the transmission before the throttle is opened and for disengaging the transmission after the throttle is closed.

24. Control apparatus for a marine engine having a throttle and a reversible transmission, including an engine control shaft having forward and reverse positions and an intermediate neutral position, a transmission actuating shaft, a Geneva cam device operatively connecting the two shafts for engaging the transmission during the initial rotation of the control shaft from neutral in either direction and for disengaging the transmission during the last part of return rotation of the control shaft in either direction to neutral, and means operatively connecting said control shaft to said throttle for opening the throttle after the initial rotation of the control shaft in either direction and for closing the throttle before the last part of return rotation of the control shaft in either direction to neutral.

25. Control apparatus for a marine engine having a throttle and a reversible transmission, including an engine control shaft having forward and reverse positions and an intermediate neutral position, a transmission actuating shaft, a Geneva cam device operatively connecting the two shafts for engaging the transmission during the initial rotation of the control shaft from neutral in either direction and for disengaging the transmission during the last part of return rotation of the control shaft in either direction to neutral, a throttle control arm, and means connecting said control shaft to said arm for moving the arm in one direction to open the throttle after initial rotation of the control shaft in either direction and for moving the arm in the opposite direction to close the throttle before the last part of return rotation of the control shaft in either direction to neutral.

26. Control apparatus for a marine engine having a throttle and a reversible transmission, including an engine control shaft having forward and reverse positions and an intermediate neutral position, a transmission actuating shaft, a Geneva cam device operatively connecting the two shafts for engaging the transmission during the initial rotation of the control shaft from neutral in either direction and for disengaging the transmission during the last part of return rotation of the control shaft in either direction to neutral, means operatively connecting said control shaft to said throttle for opening the throttle after the initial rotation of the control shaft in either direction and for closing the throttle before the last part of return rotation of the control shaft in either direction to neutral, and a one-direction brake device having a shaft operatively connected to said control shaft for yieldingly holding the throttle at any point of its range of opening movement, said brake device having a driving member fixed on said brake shaft and a driven member, and a friction brake engaging the driven member.

27. Control apparatus for a marine engine having a throttle and a reversible transmission, including an engine control shaft having forward and reverse positions and an intermediate neutral position, a transmission actuating shaft, a Geneva cam device operatively connecting the two shafts for engaging the transmission during the initial rotation of the control shaft from neutral in either direction and for disengaging the transmission during the last part of return rotation of the control shaft in either direction to neutral, a throttle control arm, means connecting said control shaft to said arm for moving the arm in one direction to open the throttle after initial rotation of the control shaft in either direction and for moving the arm in the opposite direction to close the throttle before the last part of return rotation of the control shaft in either direction to neutral, and a one-direction brake device having a shaft operatively connected to said throttle control arm for frictionally restraining closing of the throttle and allowing unrestricted opening of the throttle, said brake device having a driving member fixed on said brake shaft and a driven member, and a friction brake engaging the driven member.

References Cited in the file of this patent

UNITED STATES PATENTS

| | | |
|---|---|---|
| 894,232 | Richards | July 28, 1908 |
| 1,906,341 | Sejersen | May 2, 1933 |
| 2,358,094 | Panish | Sept. 12, 1944 |
| 2,404,545 | Stevens | July 23, 1946 |
| 2,422,596 | Stevens | June 17, 1947 |

FOREIGN PATENTS

| | | |
|---|---|---|
| 321,597 | Great Britain | Nov. 14, 1929 |